Feb. 12, 1946. W. F. BROWN 2,394,893
APPARATUS FOR CONDITIONING MOLTEN GLASS
Filed Nov. 9, 1940 4 Sheets-Sheet 1

Inventor
WILBUR F. BROWN.
By Frank Fraser
Attorney

Inventor
WILBUR F. BROWN.
By Frank Fraser
Attorney

Feb. 12, 1946. W. F. BROWN 2,394,893
APPARATUS FOR CONDITIONING MOLTEN GLASS
Filed Nov. 9, 1940 4 Sheets-Sheet 4
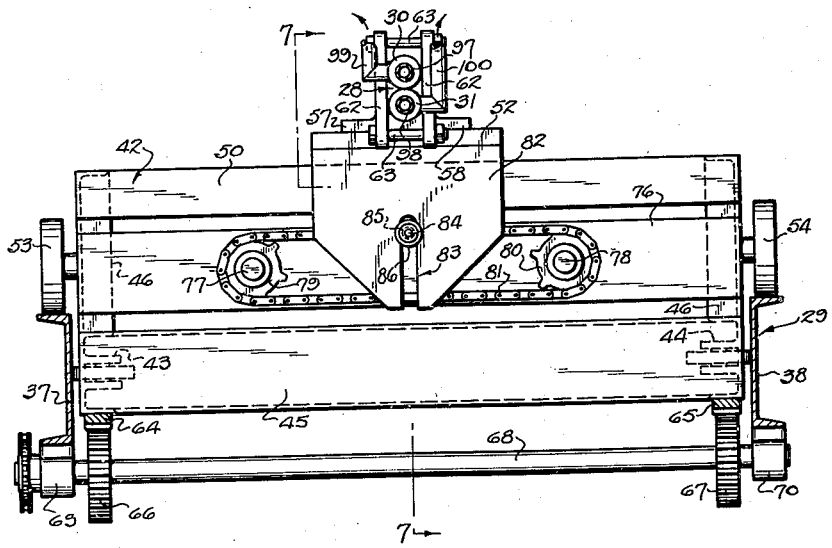
Fig. 6.
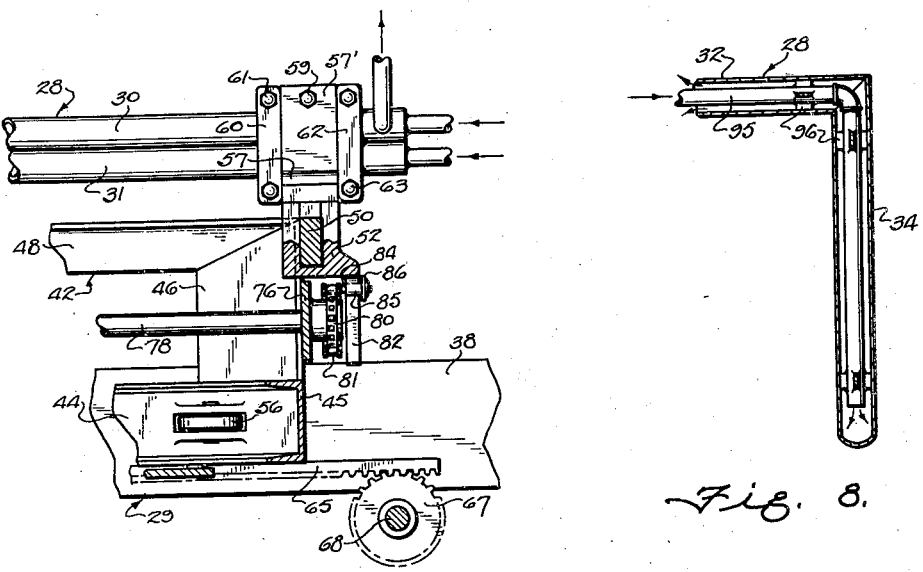
Fig. 7.
Fig. 8.
Inventor
WILBUR F. BROWN,
By Frank Fraser
Attorney Patented Feb. 12, 1946

2,394,893

UNITED STATES PATENT OFFICE 2,394,893

APPARATUS FOR CONDITIONING MOLTEN GLASS

Wilbur F. Brown, Toledo, Ohio, assignor to Libbey-Owens-Ford Glass Company, a corporation of Ohio Application November 9, 1940, Serial No. 365,091

5 Claims. (Cl. 49—54)

My invention relates broadly to the conditioning of molten glass and more particularly to an improved method of and apparatus for controlling the condition and temperature of molten glass in a tank furnace.

Although the invention is not limited to the treatment of any particular kind of glass or glasses, it is of especial utility in the conditioning of opal glasses. Also, while not restricted to use in connection with any specific furnace construction, the invention is primarily adapted for use in connection with continuous tank furnaces wherein the molten glass is melted in one end of the furnace and caused to flow slowly therethrough into the working end thereof from which the glass may be flowed, gathered, drawn, or otherwise removed.

In the manufacture of sheets or plates from opal glasses produced in the above type of tank furnace, it has been customary to withdraw successive charges of molten glass from the furnace and roll each charge to sheet form by means of the conventional table and roll casting method. In this method, the charge of molten glass withdrawn from the furnace is deposited upon the top of a metal casting table and the table passed beneath a rotatable metal forming roll or rolls which reduces the charge of glass to a sheet of predetermined uniform thickness. The newly formed glass sheet is then removed from the casting table and passed into and through an annealing leer in which it is brought to room temperature and a high fire polished surface imparted thereto. Good commercial opal glasses having a fire polished finish have long been produced by this method.

Recently, there has been an increasing demand for opal glasses having a mechanically ground and polished finish and, to satisfy this demand, the company to which this application is assigned undertook to mechanically grind and polish the opal glasses produced by it and which are well known under the trade name "Vitrolite". It was considered at first that this would present no great difficulty as the assignee company is a large producer of plate glass and is fully equipped and experienced in the grinding and polishing of glass. However, much to the surprise of all concerned, it was found that upon being ground and polished, the opal glass sheets had a decidedly streaky appearance. These streaks were an off-color from the body of the sheet and were very pronounced. Further, they occurred in different portions of the sheets, rendering them commercially unsatisfactory. This was particularly true in the case of relatively large sheets, for example 60 x 136 inches, as it was found that for every one of these sheets which was ground and polished contained one or more of these objectionable streaks.

Although it had been realized that certain streaks were present in the opal glasses having fire polished surfaces, the streaks were not commercially objectionable. Consequently, no effort had been previously made to effect the removal of these streaks and there was no reason to expect that they would show up any more prominently upon mechanical grinding and polishing of the glass. The fact remains, however, that when the sheets were ground and polished, the streaks became very noticeable, and I believe that this was due to the fact that upon grinding and polishing the fire polished skin or finish on the glass, which previously covered the streaks, was removed, as a result of which the streaks became clearly visible to the naked eye and commercially objectionable.

The attention of the most experienced practical and technical men of the assignee company was at once focused upon the problem of eliminating these streaks, but attempts to remove them encountered great and entirely unexpected difficulties. Many theories were advanced as to the cause of the streaks and corresponding ways and means suggested by which they might be eliminated. These attempts were unsuccessful and large amounts of commercially unsatisfactory glass was produced as a result.

No trouble had been experienced in the melting of the opal glasses or at the furnace end of the process and there was no apparent connection between the treatment of the molten glass in the furnace and the streaky condition in the finished ground and polished sheets. Nevertheless, it was my firm belief that such streaks were caused by certain conditions existing in the furnace, and that they could be eliminated by a more thorough conditioning of the molten glass whereby to secure improved homogeneity and substantial uniformity of temperature of all portions of the glass in the working end of the furnace. I proposed that this be done by a stirring of the molten glass in such a manner as to completely and thoroughly mix the glass to render it of a homogeneous nature and to, at the same time, obtain a controlled uniform temperature throughout the body of molten glass from which the successive charges of glass were withdrawn for sheet formation. In other words, it was my opinion that if the molten glass in the working end of the furnace were stirred in an even uniform manner to thoroughly mix the glass so that it would present a homogeneous body both as to condition and temperature, the streaks present in the glass and which rendered the sheets commercially unsatisfactory upon being ground and polished would be eliminated.

Notwithstanding the fact that there was nothing to indicate that the streaks, which showed up in the glass sheets upon mechanical grinding and polishing thereof, were due to unhomogeneity in the condition or temperature of the molten glass in the furnace, it was found that the stirring of the molten glass in the working end of the furnace in accordance with my invention proved immediately successful in that the streaks entirely disappeared from the glass and did not show up upon grinding and polishing thereof. In fact, my invention has been continuously used by the assignee company since its adoption and the streaks have not reappeared in the glass sheets.

Although I do not wish to be confined to any particular theory as to the nature of the streaks present in the glass sheets prior to my invention, I am of the opinion that they resulted from two causes, both originating in the treatment of the molten glass in the furnace, namely, burnt out opacity and color striking. As regards the first cause, in the making of opal glasses, excessively hot areas may be formed upon the top of the body of molten glass in the furnace. The materials which cause opacity in the glass are volatilized or burned out in these excessively hot areas. The burnt out portions of the molten glass tend to segregate and settle to the bottom of the glass mass. Small areas of burnt out glass are thus present throughout the mass and when they are gathered in a ladle, poured onto the casting table, and finally acted upon by the forming roll, they produce conditions in the sheet which show up as streaks when the sheet is mechanically ground and polished.

On the other hand, those streaks which occur in the sheets as a result of color striking are due to a temperature differential in the body of molten glass in the furnace from which the charges of molten glass are withdrawn for sheet formation. Thus, there is ordinarily a tendency for the molten glass in the working end of the furnace to separate into different layers which are of different temperatures. Naturally, the top layer of molten glass will be the hottest, and the bottom layer the coldest, while the intermediate layers will be of varying temperatures. Since the different layers of molten glass in the working end of the furnace are of different temperatures and since the glass withdrawn from the furnace is taken from the different layers, the sheets formed therefrom will contain portions having different temperatures.

When the molten glass is withdrawn from the furnace and deposited upon the metal casting table preparatory to being rolled to sheet form, the color and opacity of the glass are not fully developed. However, after being rolled to sheet form and caused to undergo a predetermined time and temperature cycle, the color and opacity gradually develop in the glass sheet. Due to the fact, however, that the molten glass is of an un-uniform temperature when it contacts the metal surface of the casting table or is acted upon by the metal forming roll, the color of certain areas of the formed sheet develop to a greater or less extent than that of the main body portion of the sheet and this over or under development of the color in these areas of the sheet show up as streaks in the sheet upon subsequent grinding and polishing thereof.

It is an aim of my invention to provide an improved method of and apparatus for conditioning the molten glass in the furnace, and more particularly in the working end thereof, in such a manner as to effectually overcome those objectionable conditions heretofore encountered in the treatment of the glass in the furnace and which result in the formation of streaks in the finished sheets.

This aim is herein achieved by effecting a stirring of the body of molten glass in the working end of the furnace evenly and uniformly throughout substantially its entire area as well as throughout substantially its entire depth whereby to render it thoroughly homogeneous both as to condition and temperature. Thus, the stirring of the molten glass increases the homogeneity thereof and mixes any burnt out portions of the glass, which might cause streaks in the finished sheet, intimately into the glass mass, thereby producing a uniform opal glass. Also, the stirring of the molten glass effects a controlled uniform cooling of the body of glass and in this way reduces the tendency toward the formation of those excessively hot areas in which the opacifying materials are apt to be burnt out. Furthermore, the stirring of the molten glass throughout substantially its entire depth causes a thorough mixing of all layers of the glass body, with the result that the molten glass upon being withdrawn from the furnace will be of a uniform temperature. As a consequence, when the molten glass is deposited upon the casting table and rolled to sheet form, the color and opacity of the glass will develop uniformly so as to avoid the formation of burnt out opacity streaks or color struck areas.

Another aim of my invention is the provision of an improved method of and apparatus for effecting the elimination of those streaks referred to above in a thoroughly practical, efficient and economical manner to the end that sheets of opal glass having commercially satisfactory mechanically ground and polished surfaces can be produced without requiring any changes in the general process heretofore followed by the assignee company in the manufacture of its opal glasses or the method and apparatus by which the glasses are formed into sheets.

Other objects and advantages of the invention will become more apparent during the course of the following description, when taken in connection with the accompanying drawings.

In the drawings, wherein like numerals are employed to designate like parts throughout the same:

Fig. 6 is an end view of the apparatus of Fig. 5;

Fig. 7 is a vertical sectional view taken substantially on line 7—7 of Fig. 6; and Fig. 8 is a detail sectional view of a portion of the stirring implement illustrating the internal cooling thereof.

Figure 1:
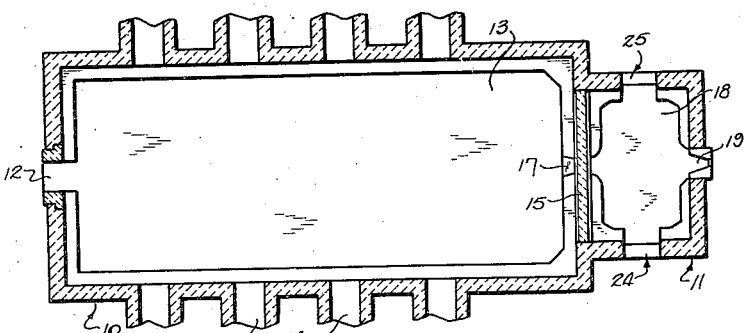
Fig. 1 is a plan view of one type of continuous tank furnace in connection with which my invention may be used.
Figure 2:
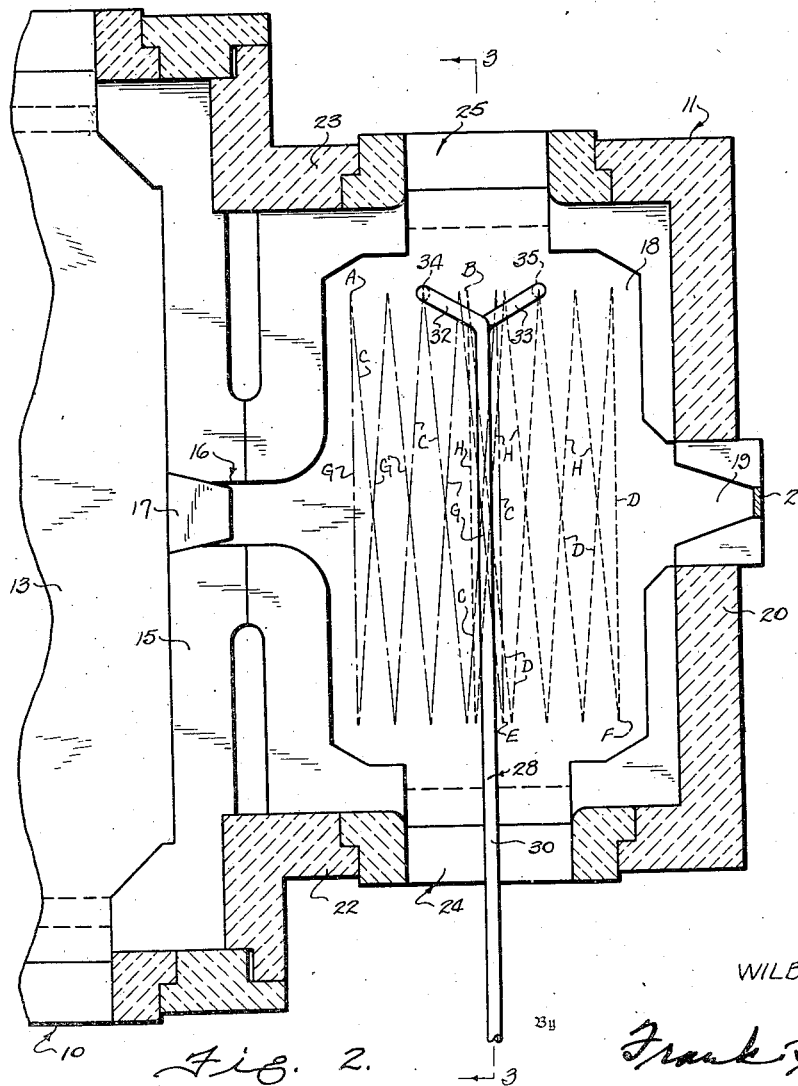
Fig. 2 is an enlarged plan view of the working end of the furnace illustrating the action of the stirring apparatus associated therewith.
Figure 3:
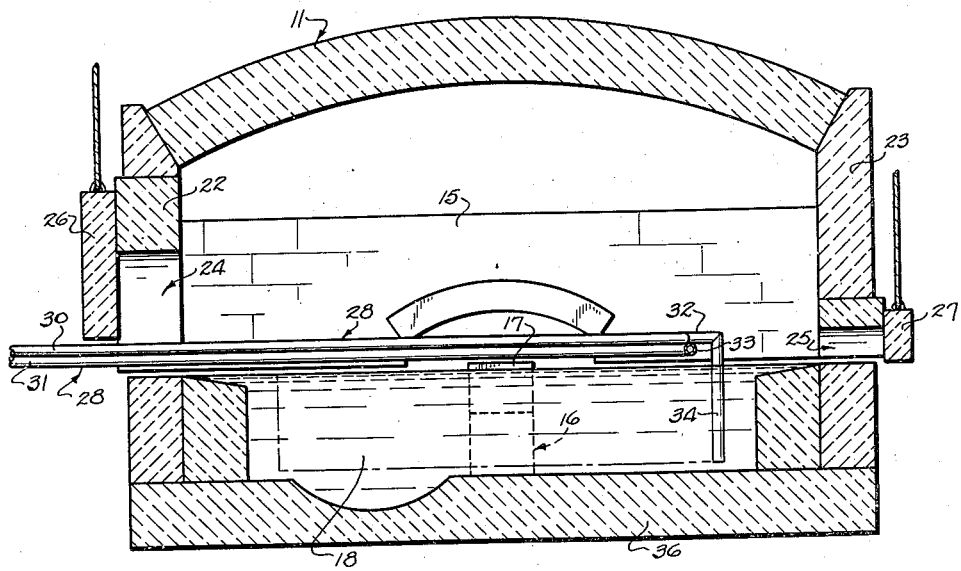
Fig. 3 is a transverse sectional view through the working end of the furnace taken substantially on line 3—3 of Fig. 2.
Figure 4:
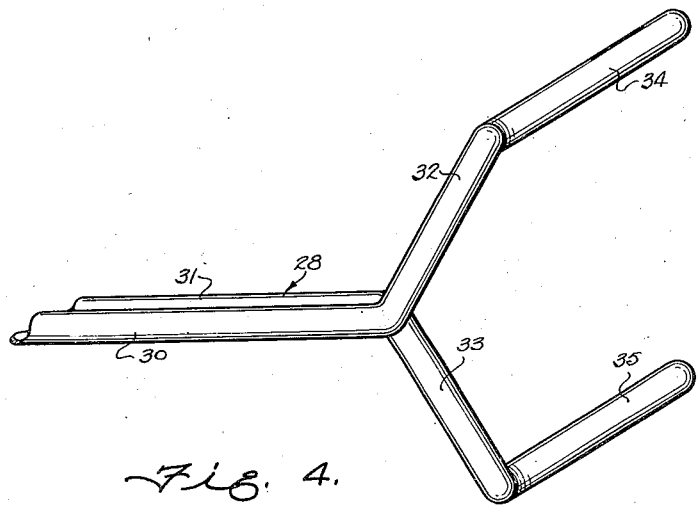
Fig. 4 is a perspective view of the outer end of the stirring implement.

With reference now to the drawings and particularly to Figs. 1, 2 and 3, there is illustrated a continuous tank furnace of conventional construction comprising an elongated melting end or chamber 10 and a relatively smaller working end or chamber 11. The glass batch ingredients are introduced into the melting chamber 10 through an opening 12 at one end thereof and are melted therein to produce the mass of molten glass 13. The heating means for the furnace consists of the usual regenerators arranged along opposite sides of the melting chamber 10 and communicating therewith by the ports 14.

The working chamber 11 is separated from the melting chamber 10 by a dividing wall 15 which serves to block off the flow of molten glass therebetween, said dividing wall 15 being provided approximately centrally of the furnace with a relatively narrow opening 16 through which the glass is permitted to flow from the melting chamber into the working chamber. It is preferred that the upper end of the flow opening 16 be closed by a block or plug 17 beneath which the molten glass must flow. In this way, only sub-surface glass can pass from the melting chamber 10 into the working chamber 11.

The body or pool of molten glass 18 contained in the working chamber 11 may be flowed, gathered, drawn or otherwise removed therefrom. As here shown, however, the molten glass is adapted to flow from the working chamber through an outlet 19 in the forward end wall 20 thereof and which is normally closed by a gate 21. The opposite side walls 22 and 23 of the working chamber are provided with openings 24 and 25 controlled by gates 26 and 27 respectively. These openings may be used for observing the condition of the molten glass; for skimming the body or pool of glass; or for ladling the glass from the working chamber. As the molten glass flows slowly through the melting chamber 10, it will undergo a refining action and additional refining will take place in the working chamber 11 so that this chamber is oftentimes referred to as the refining chamber.

The company to which this application has been assigned has long used the particular type of furnace herein disclosed for the manufacture of its opal glasses known in the trade by the name of "Vitrolite." In forming the glass into sheets or plates, successive charges of molten glass are flowed from the outlet 19 into a metal ladle and each charge of glass is poured from the ladle onto the top of a metal casting table upon which it is rolled into a sheet or plate of predetermined uniform thickness. The glass sheet is then removed from the table and passed into and through an annealing leer wherein it is brought to room temperature and emerges therefrom with a high fire polished finish. Good "A" grade commercial opal glass sheets and plates having fire polished surfaces have thus been produced for a number of years by the assignee company.

As explained above, these opal glasses were never mechanically ground and polished by the assignee company until quite recently when a demand was felt for opal glasses having a ground and polished finish. However, as also explained above, when the glass sheets were ground and polished they had a decidedly streaky appearance rendering them commercially unsatisfactory. According to my invention, these streaks which have been more fully described hereinabove have been definitely eliminated by a more thorough conditioning of the molten glass in the furnace and particularly in the working end thereof whereby to render it homogeneous both as to condition and temperature. This conditioning of the glass is herein effected by the substantially even and uniform stirring of the entire body or pool of molten glass in the working end of the furnace and by simultaneously obtaining a controlled uniform cooling thereof.

One form of stirring apparatus which may be used in carrying out my invention is illustrated in the accompanying drawings and comprises a novel stirring implement designated in its entirety by the numeral 28 and improved supporting and actuating mechanism therefor designated generally by the numeral 29. The supporting and actuating mechanism 29 is arranged exteriorly of the furnace, while the stirring implement 28 is introduced into the working chamber 11 thereof through the opening 24 or 25 in the respective side wall 22 or 23 thereof and has a portion thereof immersed in the body or pool of molten glass 18.

The stirring implement 28 comprises a pair of longitudinally extending metal supporting pipes 30 and 31 arranged parallel one above the other. The outer end portions of the pipes 30 and 31 are provided with the diverging horizontal arms 32 and 33 respectively to the outer ends of which are secured the depending substantially vertical stirring legs 34 and 35. As best shown in Fig. 3, the supporting pipes 30 and 31 extend horizontally above the body of molten glass 18 in working chamber 11, while the depending stirring legs 34 and 35 project downwardly into the body of glass 18 and terminate just slightly above the bottom 36 of the furnace.

The stirring implement 28 is actuated in such a manner as to effect a substantially uniform stirring of the entire body of molten glass 18 in working chamber 11 or, in other words, a complete stirring of the body of glass throughout substantially its entire length, width and depth so that all portions thereof will be thoroughly mixed with one another and rendered perfectly homogeneous. More specifically, the stirring implement 28 is reciprocated transversely of the working chamber 11 while at the same time being moved simultaneously longitudinally of the furnace, with the result that the stirring legs 34 and 35 thereof move through paths extending diagonally of the working chamber. The movement of the stirring implement 28 is illustrated diagrammatically by the broken lines in Fig. 2, in which the dot and dash lines indicate the path of movement of the stirring leg 34 and the dotted lines the path of movement of the stirring leg 35. The particular movement of the stirring implement will be more fully hereinafter described.

The supporting and actuating mechanism 29 for the stirring implement 28 comprises a substantially rectangular supporting frame composed of the longitudinally extending side members 37 and 38 and the transverse end members 39 and 40. The supporting frame is mounted in a fixed position and to this end may be secured to a suitable foundation at the four corners thereof as indicated at 41 or in any other suitable manner. Carried by the stationary supporting frame and mounted for movement longitudinally thereof is a carriage 42. The carriage 42 also comprises a rectangular frame formed of the longitudinally extending channel members 43 and 44 which are arranged inwardly of and parallel with the side members 37 and 38 respectively of the stationary supporting frame and connected together at each end by a transverse end member 45.

Secured to the carriage frame at each of the four corners thereof is an upright 46 and extending longitudinally of the carriage and secured to the uprights are the side members 47 and 48. Also secured to the uprights 46 at opposite ends of the carriage are the transverse slide bars 49 and 50 upon which are slidably mounted the guide blocks 51 and 52 respectively for supporting the stirring implement 28. Carried by the corner uprights 46 at one side of the carriage 42 are wheels 53 which ride along upon the side member 37 of the stationary supporting frame while carried by the corner uprights at the opposite side of the carriage are wheels 54 which ride along upon the side member 38 of said supporting frame. To prevent transverse shifting movement of the carriage 42 relative to the stationary supporting frame, the channel member 43 of the carriage frame carries spaced thrust wheels 55 which engage the side member 37 of the supporting frame, while carried by the channel member 44 of the carriage frame are thrust wheels 56 engaging the side member 38 of said supporting frame.

The stirring implement 28 extends horizontally between and is secured upon the guide blocks 51 and 52 carried by the slide bars 49 and 50 respectively. For this purpose, each guide block 51 and 52 has secured to the top thereof a pair of L-shaped brackets 57 and 58 having spaced vertical portions 57' and 58' respectively between which the supporting pipes 30 and 31 of the stirring implement 28 are received and to which they are secured by bolts or the like 59. For the purpose of preventing longitudinal shifting movement of the stirring implement relative to the guide blocks 49 and 50, there is carried by the supporting pipes 30 and 31, at one side of each guide block, a pair of clamping plates 60—60 secured together by bolts or the like 61 and at the opposite side of each guide block a pair of clamping plates 62—62 secured together by bolts or the like 63.

The carriage 42 is movable back and forth upon the stationary supporting frame to reciprocate the stirring implement 28 transversely within the working chamber 11 and for this purpose the side channel members 43 and 44 of the carriage frame are provided upon the bottoms thereof with longitudinally extending rack bars 64 and 65. Meshing with the rack bars 64 and 65 are gears 66 and 67 respectively fixed to a shaft 68 extending transversely of the supporting frame and mounted within bearings 69 and 70 carried by the side members 37 and 38 respectively thereof. The shaft 68 is driven from a motor 71 suitably mounted upon the stationary supporting frame and driving, through reduction gearing located in the casing 72, a chain and sprocket drive 73 and shaft 74 which is connected with the shaft 68 by a chain and sprocket drive 75. Of course, any other suitable type of drive may be provided for the shaft 68.

The motor 71 is a reversible type motor operable to rotate the shaft 68 first in one direction and then the other to move the carriage 42 forwardly and backwardly upon the supporting frame. Simultaneous with the reciprocating movement of the carriage, the guide blocks 51 and 52 are adapted to be moved back and forth along the slide bars 49 and 50 at right angles to the direction of the movement of the carriage 42. To this end, there is secured to the corner uprights 46 at each end of the carriage 42 a transverse plate 76 and extending between and rotatably carried by said plates are the spaced parallel shafts 77 and 78. Secured to each end of the shafts 77 and 78 are sprockets 79 and 80 respectively about which is trained a sprocket chain 81. Carried by each guide block 51 and 52 is a vertical plate 82 provided with a vertical slot 83. Attached to each sprocket chain 81 is a horizontal pusher pin 84 extending through the slot 83 in the respective plate 82 and having a freely rotatable roller 85 thereon held upon said pin by a suitable washer or nut 86.

With the above construction, as the shafts 77 and 78 are rotated, the sprocket chains 81 will be driven in unison and the rollers 85 engaging the side walls of the slots 83 in vertical plates 82 will move the guide blocks 51 and 52 along the slide bars 49 and 50. The slots 83 are of course sufficiently long so that the rollers 85 will remain therein during the travel of said rollers along the lower runs of the sprocket chains 81 as well as in the upper runs thereof. The means for driving the shafts 77 and 78 comprises a motor 87 driving suitable speed reducing gearing located in casing 88 through a chain and sprocket drive 89. The shaft 90 of the speed reducer gearing drives the shaft 77 through a chain and sprocket drive 91; and rotation of shaft 77 will be imparted to shaft 78 through the sprocket chains 81. It will therefore be seen that upon operation of the motors 71 and 87, the carriage 42 will be moved backwardly and forwardly upon the stationary supporting frame and that simultaneously the guide blocks 51 and 52 will be moved along the slide bars 49 and 50 in a direction at right angles to the direction of movement of the carriage.

In order to automatically effect the reversal of the carriage 42 when it reaches the end of its forward or backward movement, there are provided two limit switches 92 and 93 connected in series with the reversible motor 71. Thus, as the carriage moves forwardly and engages switch 92, the motor 71 will be reversed to move the carriage rearwardly until it actuates switch 93, whereupon the motor 71 will again be reversed and the carriage moved forwardly. A suitable bumper 94 may be provided, if desired, at the rear end of the supporting frame and engageable by the carriage 42 to prevent undue jar and shock thereto when it reaches the limit of its backward movement.

The stirring implement 28 is adapted to be internally cooled and this cooling thereof serves two definite purposes. In the first place, it renders the stirrer capable of withstanding the intense heat to which it is subjected in use and, secondly, it gives a controlled cooling of the body of molten glass 18 in the working chamber 11. Although the stirring implement may be cooled in different ways, it is herein accomplished by arranging within each supporting pipe 30 and 31 a relatively smaller feed pipe 95 which extends through the angular arm 32 or 33 thereof into the respective stirring leg 34 or 35 and terminates relatively close to the closed lower end of said leg as shown in Fig. 8. The feed pipe 95 may be secured in concentric spaced relation to the supporting pipe 30 or 31 and its respective arm 32 or 33 and stirring leg 34 or 35 by welding or in any other desired manner as indicated at 96. Water or other suitable cooling medium is introduced into the feed pipes 95 in supporting pipes 30 and 31 through inlet connections 97 and 98 respectively and after passing through said feed pipes is discharged from the outer ends thereof into the stirring legs 34 and 35 and caused to flow rearwardly and discharge through conduits 99 and 100.

By effecting a positive cooling of the stirring legs 34 and 35 in this manner, a controlled cooling of the body of molten glass 18 in the working chamber 11 can be effectively obtained. As the stirring implement 28 covers substantially the entire area of the body of glass 18 and also since the stirring legs project throughout substantially the entire depth of the glass body, all portions thereof will not only be uniformly stirred, but likewise the temperature of all portions thereof will be uniformly controlled. This will result in the glass body being of a homogeneous nature both as to its condition and temperature so that the charges of the glass withdrawn from the furnace for sheet formation will also be homogeneous and of a uniform temperature. Since all portions of the glass sheet produced from the charge of molten glass will have the same temperature, the color and opacity of the sheet will develop uniformly so as to avoid the formation of burnt out opacity streaks and color struck areas heretofore caused by unhomogeneity and ununiform temperature conditions in the glass. The temperature of the water or other cooling medium employed for cooling the stirring implement can be varied depending upon the amount of cooling desired.

Not only does my invention accomplish the above important objects but, in addition, I have found that as a result of the use of my invention other defects heretofore present in the glass, such as seeds, bubbles, holes, etc., are greatly reduced. I believe that this is due to the fact that the stirring of the molten glass causes the liberation of gases and bubbles therefrom. In addition, the stirring of the glass prevents the formation of areas of dead glass in the furnace which may also be the cause of streaks in the glass sheet. Since my invention eliminates the presence of streaks in the glass sheets to such an extent that the sheets may be satisfactorily ground and polished, it obviously follows that it also greatly improves the quality of the glass sheets having a fire polished finish and before being ground and polished. Although, as stated above, the presence of these streaks in opal glasses having a fire polish finish were not commercially objectionable, yet their elimination naturally enhances the quality of the glass.

Figure 5:
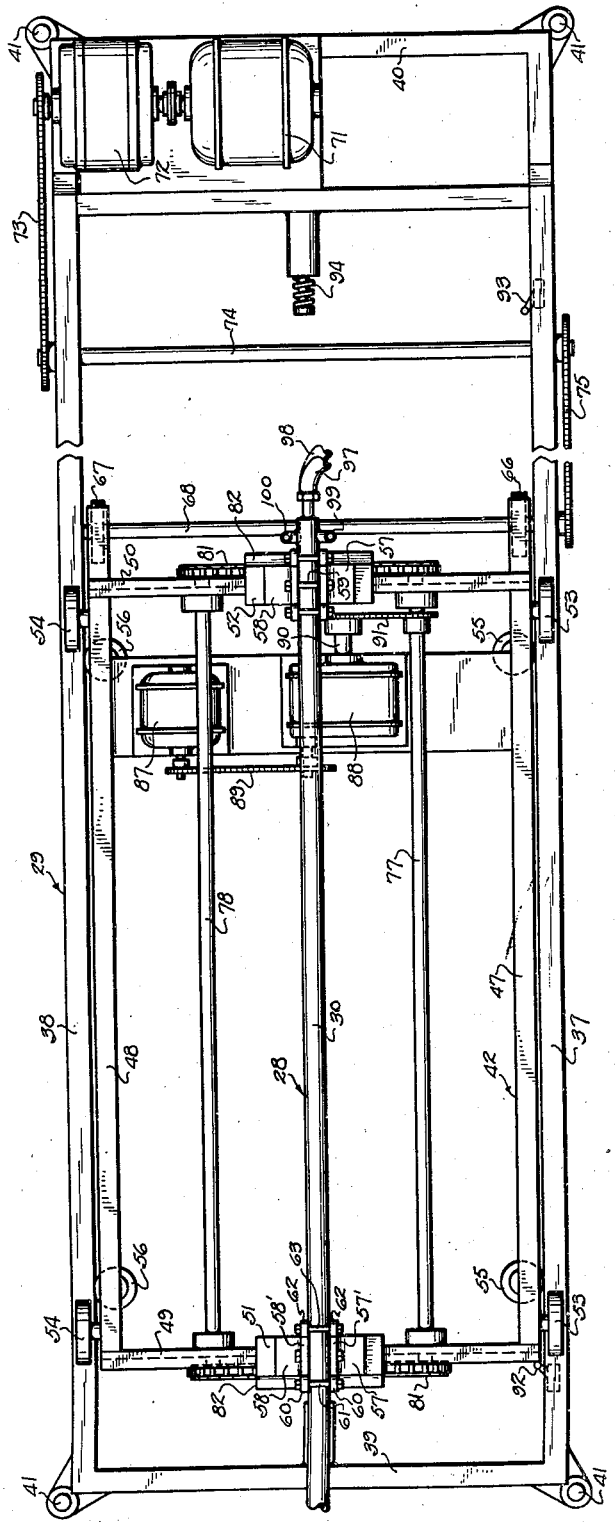
Fig. 5 is a plan view of the apparatus for supporting and actuating the stirring implement.

With reference particularly to Fig. 2, illustrating diagrammatically the path of travel of the stirring implement 28, let us assume that the stirring implement is in the far left-hand corner of the working chamber 11 with the stirring legs 34 and 35 in the positions indicated at A and B respectively. At this time, the carriage 42 will be in its extreme forward position as illustrated in Fig. 5. The motor 71 is then placed in operation to move the carriage 42 backwardly and forwardly upon the stationary supporting frame with the result that the stirring legs 34 and 35 will be reciprocated transversely of the working chamber 11 along the lines C and D respectively. During the backward and forward movement of the carriage 42 the motor 87 will operate to drive the shafts 77 and 78 and sprocket chains 81 to move the guide blocks 51 and 52 along slide bars 49 and 50 and the stirring implement carried thereby transversely of the carriage at substantially right angles to the backward and forward movement thereof. This combined movement of the stirring implement transversely and longitudinally of the furnace causes the stirring legs 34 and 35 to travel diagonal paths extending transversely of the working chamber 11 as indicated by the lines C and D.

The forward movement of the stirring implement is continued until the stirring legs 34 and 35 reach the positions indicated at E and F respectively. At this time, the pusher pins 84 carried by sprocket chains 81 move around sprockets 80 and start their movement in the opposite direction, while the transverse reciprocating movement of the carriage is continued. As a result, the stirring legs will move longitudinally of the furnace in a rearward direction and traverse diagonal paths G and H respectively extending transversely of the working chamber and criss-crossing the paths C and D respectively traversed thereby during their forward movement. This movement is continued until the stirring legs 34 and 35 again reach starting positions A and B. From the above, it will be clearly seen that the stirring legs 34 and 35 cover the body of molten glass 18 throughout substantially the entire width, length and depth thereof.

Although I do not wish to be limited to any particular glass temperatures, furnace sizes, speed of stirring, etc., yet I might mention, by way of example only, that in one commercial installation my invention was employed in the conditioning of a body of molten glass approximately 5 feet x 8 feet, having a depth of approximately 20 inches and a temperature of about 2300 degrees F. The stirring implement 28 was actuated so that its backward and forward stroke was 6 feet and its movement longitudinally of the furnace 4 feet. This meant that the stirring legs came to within 6 inches of the side walls of the glass container and within 12 inches of the end walls thereof. The stirring legs also extended downwardly into the glass to approximately 4 inches from the bottom thereof. The stirring implement was reciprocated transversely across the furnace five times at the rate of approximately 37 feet per minute, while being simultaneously moved one time longitudinally of the furnace at about 3 feet per minute. The above is illustrative only of the invention although it might be stated that, as a general rule, the stirring legs can be operated to stir as close to the side and end walls of the furnace and bottom wall thereof as possible without dislodging any devitrified glass which might be adhered to the furnace walls. Also, as a general rule, the speed of movement of the stirring implement should be so controlled in relation to the viscosity of the glass that no folding of the glass or entrapment of air therein occurs during stirring.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for stirring a pool of molten glass contained in a tank furnace, a stirring implement having a portion thereof adapted to be immersed in the molten pool, means for reciprocating said stirring implement transversely of said pool, means for simultaneously moving said stirring implement longitudinally of said pool in a so-called "forward" direction so that it traverses diagonal paths extending transversely of the furnace, and means for reversing the longitudinal travel of said stirring implement while maintaining its transverse reciprocating movement to cause it to move in a so-called "backward" direction whereupon it traverses diagonal paths extending transversely of the furnace and criss-crossing the paths traversed thereby in its forward movement.

2. In apparatus for stirring a pool of molten glass contained in a tank furnace, a stirring implement having a portion thereof adapted to be immersed in the molten pool, a carriage for supporting said stirring implement and movable back and forth in a substantially straight path to reciprocate said stirring implement within said molten pool, and means for simultaneously moving said stirring implement upon said carriage at substantially right angles relative to the direction of movement of the said carriage.

3. In apparatus for stirring a pool of molten glass contained in a tank furnace, a stirring implement having a portion thereof adapted to be immersed in the molten pool, a carriage for supporting said stirring implement and movable back and forth in a substantially straight path to reciprocate said stirring implement within said molten pool, said carriage including a pair of spaced transverse slide bars, supporting members slidably mounted upon said slide bars and carrying said stirring implement, and means for moving said supporting members along said slide bars first in one direction and then the other.

4. In apparatus for stirring a pool of molten glass contained in a tank furnace, a stirring implement having a portion thereof adapted to be immersed in the molten pool, a stationary supporting frame, a carriage movably mounted upon said supporting frame, means carried by and movable transversely of said carriage for supporting said stirring implement, means for reciprocating said carriage upon said supporting frame to move said stirring implement back and forth in a substantially straight path, and means for reciprocating said supporting means upon said carriage to move the said stirring implement at substantially right angles to the direction of movement of said carriage and simultaneous therewith.

5. In apparatus for stirring a pool of molten glass contained in a tank furnace, a stirring implement having a portion thereof adapted to be immersed in the molten pool, a stationary supporting frame, a carriage movably mounted upon said supporting frame and including a pair of spaced transverse slide bars, supporting members slidably carried by said slide bars, means for securing said stirring implement to said slide bars, means for reciprocating said carriage upon said supporting frame to move said stirring implement back and forth in a substantially straight path, and means for reciprocating said supporting members upon said slide bars to move the said stirring implement at substantially right angles to the direction of movement of said carriage and simultaneous therewith.

WILBUR F. BROWN.